United States Patent

Moghadam et al.

[11] Patent Number: 5,913,088
[45] Date of Patent: Jun. 15, 1999

[54] PHOTOGRAPHIC SYSTEM CAPABLE OF CREATING AND UTILIZING APPLETS ON PHOTOGRAPHIC FILM

[75] Inventors: Omid A. Moghadam; John R. Squilla; James D. Allen, all of Rochester, N.Y.

[73] Assignee: Eastman Kodak Company, Rochester, N.Y.

[21] Appl. No.: 08/709,076

[22] Filed: Sep. 6, 1996

[51] Int. Cl.⁶ ................................................ G03B 17/24
[52] U.S. Cl. ............................ 396/311; 396/2; 396/319
[58] Field of Search .............................. 396/1, 2, 3, 310, 396/311, 322; 348/96, 110

[56] References Cited

U.S. PATENT DOCUMENTS

| | | | |
|---|---|---|---|
| 4,677,460 | 6/1987 | Fass et al. ................................ | 358/22 |
| 5,111,224 | 5/1992 | Spector .................................... | 354/125 |
| 5,189,467 | 2/1993 | Wheeler ................................... | 354/110 |
| 5,194,892 | 3/1993 | Robison ................................... | 355/40 |
| 5,276,472 | 1/1994 | Bell et al. ................................ | 354/76 |
| 5,296,884 | 3/1994 | Honda et al. ........................... | 354/106 |
| 5,381,207 | 1/1995 | Kazumi .................................... | 354/412 |
| 5,383,027 | 1/1995 | Harvey et al. .......................... | 358/296 |
| 5,389,984 | 2/1995 | Lovenheim .............................. | 354/76 |
| 5,450,149 | 9/1995 | Cocca ...................................... | 354/106 |
| 5,461,440 | 10/1995 | Toyoda et al. .......................... | 354/106 |
| 5,479,228 | 12/1995 | Tamamura et al. ..................... | 354/106 |
| 5,493,354 | 2/1996 | Watanabe et al. ...................... | 354/106 |
| 5,500,700 | 3/1996 | Massarsky .............................. | 354/76 |
| 5,541,644 | 7/1996 | Nanba ...................................... | 348/96 |
| 5,581,299 | 12/1996 | Raney ...................................... | 348/232 |
| 5,623,303 | 4/1997 | Inoue et al. ............................. | 348/96 |
| 5,634,158 | 5/1997 | Shon et al. .............................. | 396/320 |
| 5,697,001 | 12/1997 | Ring et al. .............................. | 396/121 |

*Primary Examiner*—Safet Metjahic
*Assistant Examiner*—John Chizmar
*Attorney, Agent, or Firm*—Thomas H. Close

[57] ABSTRACT

A photographic system includes photographic film having a photographic image and digital information stored on a magnetic storage media on the film related to the processing of a digital image to be generated by scanning the film; a scanner for scanning the photographic film to produce a digital image; means for reading the digital information on the magnetic storage media; and a computer having an application program for processing the digital image according to the digital information.

9 Claims, 4 Drawing Sheets

PHOTOGRAPHIC SYSTEM CAPABLE OF CREATING AND UTILIZING APPLETS ON PHOTOGRAPHIC FILM

FIELD OF THE INVENTION

The present invention relates in general to the field of still photography, and in particular to an image capture system capable of creating and utilizing applets on photographic film.

BACKGROUND OF THE INVENTION

Systems for recording data on photographic film are known in the art. An example of such systems are disclosed in U.S. Pat. Nos. 5,493,354; 5,194,892; 5,450,149 and 5,276,472. In the '354 patent an image recording machine with a plurality of light sources is used to record indices on photographic film. In the '892 patent a film information exchange system is disclosed which records information on an invisible magnetic layer. The '149 patent discloses a camera system for recording magnetic data on photographic film in dual parallel tracks. The '472 patent discloses a photographic system which uses magnetic tracks to record audio information on exposed film.

Additionally, the Kodak Advanced Photographic System (APS), using the trade name of Advantix® utilizes camera systems such as the Kodak 3700ix, capable of recording information about the scene on an invisible layer of magnetic material on the photographic film.

Post processing of digitized photographic images may be performed on personal computers using software applications such as the Photo Enhancer by Eastman Kodak Company, Rochester, N.Y. The user, by the aide of such applications reads in a digitized image and enhances the features of the image. Enhancement, for example could be correction for defects in the image such as red eye removal in the subject or removal of dust marks. The user can also alter the subjects in the photograph, change the color balance and/or contrast of the image. The user can also add creatives, such as art work, borders or graphics to the photograph.

The use of creatives in photography has become popular in the past few years as film scanning systems such as Kodak PhotoCD system or Kodak Creation Station have allowed consumers easy access to a digital version of their photographs. Creatives are additional art such as a border, frame, or graphics such as cartoon characters which are added to a photograph. Currently, adding creatives to a digital photograph is done after the film processing and printing is completed and requires additional work on a computer at home or at a photo processing center. The user must already have, or must obtain appropriate software for adding the creative to the digital images. This requires additional effort on the part of the user and as a result limits the use of creatives and other digital image processing to the professional or the truly dedicated amateur.

Accordingly, there is a need for an improved method of distributing software for manipulating and enhancing digitized images originating from a photograph. It would also be desirable to have a simple information and delivery system which allows a photographer to choose and view creatives and other digital image processing functions at the point of capturing the photographic image on negative film and having the digital image processing functions available for use by a photo finisher or the photographer as soon as the film is processed.

SUMMARY OF THE INVENTION

The present invention is directed to overcoming one or more of the problems set forth above. Briefly summarized, according to one aspect of the present invention, a photographic system includes photographic film having a photographic image and digital information stored on a magnetic storage media on the film related to the processing of a digital image to be generated by scanning the film; a scanner for scanning the photographic film to produce a digital image; means for reading the digital information on the magnetic storage media; and a computer having an application program for processing the digital image according to the digital information. In one embodiment of the invention, the digital information is an applet. In another embodiment, the information is a pointer indicating the location of an application program stored on a server accessible via a telecommunications network, such as a web server.

Advantageous Effect of the Invention

The system of the present invention has the advantage of automating the post processing steps in the digital image enhancement and processing chain by providing the tools of post processing imaging functions with the photographic film at the point of image capture.

DETAILED DESCRIPTION OF THE INVENTION

Figure 1:
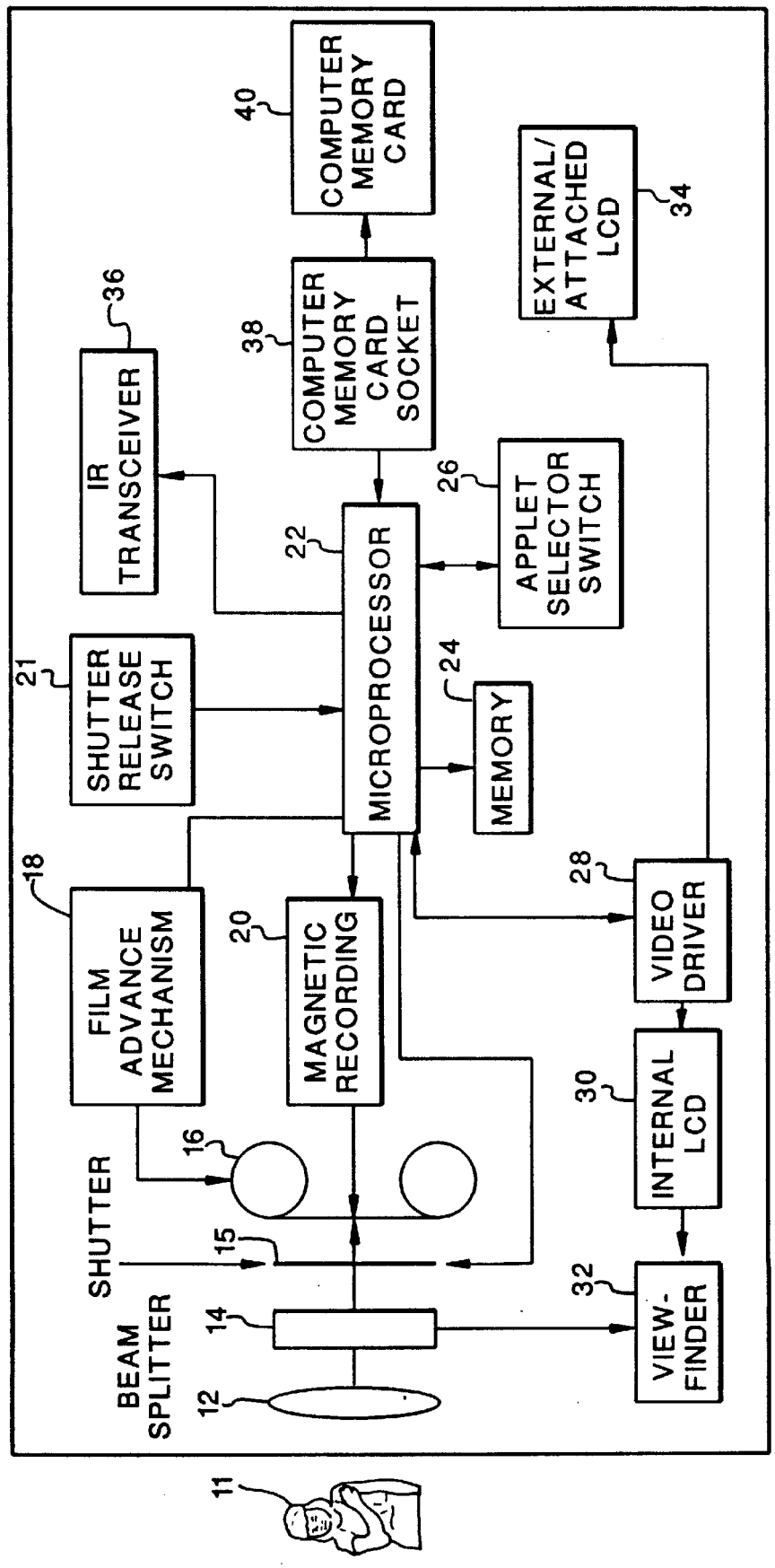
FIG. 1 is a schematic diagram illustrating a camera for recording digital image processing information on a photographic film used in a photographic system according to the present invention.

Referring to FIG. 1, a single lens reflex camera generally designated 10, includes a taking lens 12 for forming an image of a photographic subject 11 and a beam splitter 14 for selectively directing the image to a film 16 or a viewfinder 32. A photographic film 16, such as APS film, is located in the camera behind lens 12 and a shutter 15 and includes a magnetic recording medium on the film for recording digital information. The camera 10 includes a viewfinder 32, film advance mechanism 18 for advancing the film, a magnetic recording head 20 for recording digital information on the magnetic medium of the film 16, a shutter release 21, a microprocessor 22 for controlling the camera, a memory 24 for storing digital information such as a digital image processing applet, and an applet selector switch 26 to step through the applets available in camera memory.

In the event that the applet is a creative, a video driver 28 and an internal LCD screen 30 or an external LCD screen 34 may be provided so that the image of the creative may be viewed by the photographer. The video driver 28 supplies video signals to the internal LCD display 30 which can be viewed through the viewfinder 32 to superimpose the creative on the image of the subject to be photographed. Alternatively, the video signals can be supplied by the video diver 28 to an external LCD display 34 where the creative alone may be viewed. Optionally, the camera 10 is equipped with an infrared transceiver 36 for transmitting a signal to an external source requesting an applet and receiving a transmission of applet information from that external source.

An example of this embodiment is the use of it in a theme park setting such as Disney Land. The picture spots in the park fitted with an infrared transceiver capable of transmitting creative applet information (e.g. cartoon character) to the photographer's camera can transmit the applet information to the photographers camera any time a camera according to the present invention is taking a picture at that picture spot. The photographer views the applet information in the camera's viewfinder or the external LCD screen of the camera. He, then decides whether to have that information recorded on the film. When the film is processed at the photo finishing center, the presence of the applet information will instruct the photofinishing computer to construct a script to process the digitized images according to the enclosed applets and to add the certain creatives to the digitized images.

The camera 10 may also have a computer memory card socket 38 for receiving a computer memory card 40. The memory card stores a number of applets that may be accessed by the photographer.

Figure 2:
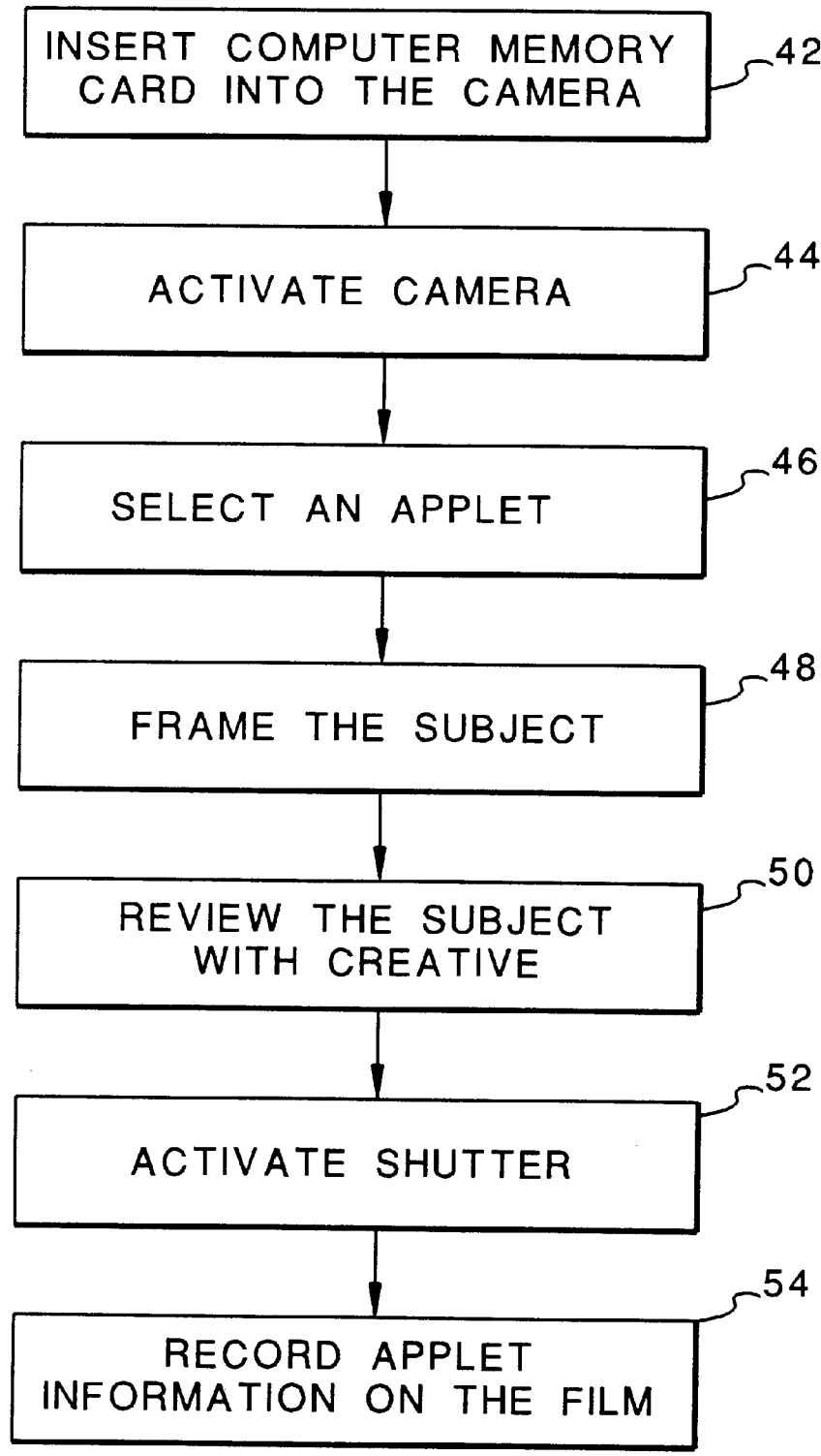
FIG. 2 is a flow chart illustrating one method of storing information relating to digital image processing on photographic film according to the present invention.

Referring to FIG. 2, in operation, a photographer inserts a computer memory card containing one or more applets into the camera (42). The photographer activates the camera (44) and selects an applet (64). The photographer frames the subject (48) and reviews (50) the image of the subject with the selected creative through the viewfinder 32. The photographer then captures the image of the subject by activating (52) the shutter release 21. The microprocessor 22 opens the shutter to expose the film and immediately after the shutter is closed, advances the film to the next frame. During film advance, the microprocessor sends the applet information to the magnetic recording head to be recorded (54) on the magnetic recording medium of the film. He can preview the different applets superimposed on the photographic subject in the viewfinder or may the preview the applet on the external LCD display of the camera by pressing the applet selector switch 26 repeatedly. The applet information is stored in the camera memory or computer memory cards or received from an external infrared source. When the desired applet is selected, the camera records the applet information on the magnetic portion of the photographic film when the film is advanced to the next frame.

Figure 3:
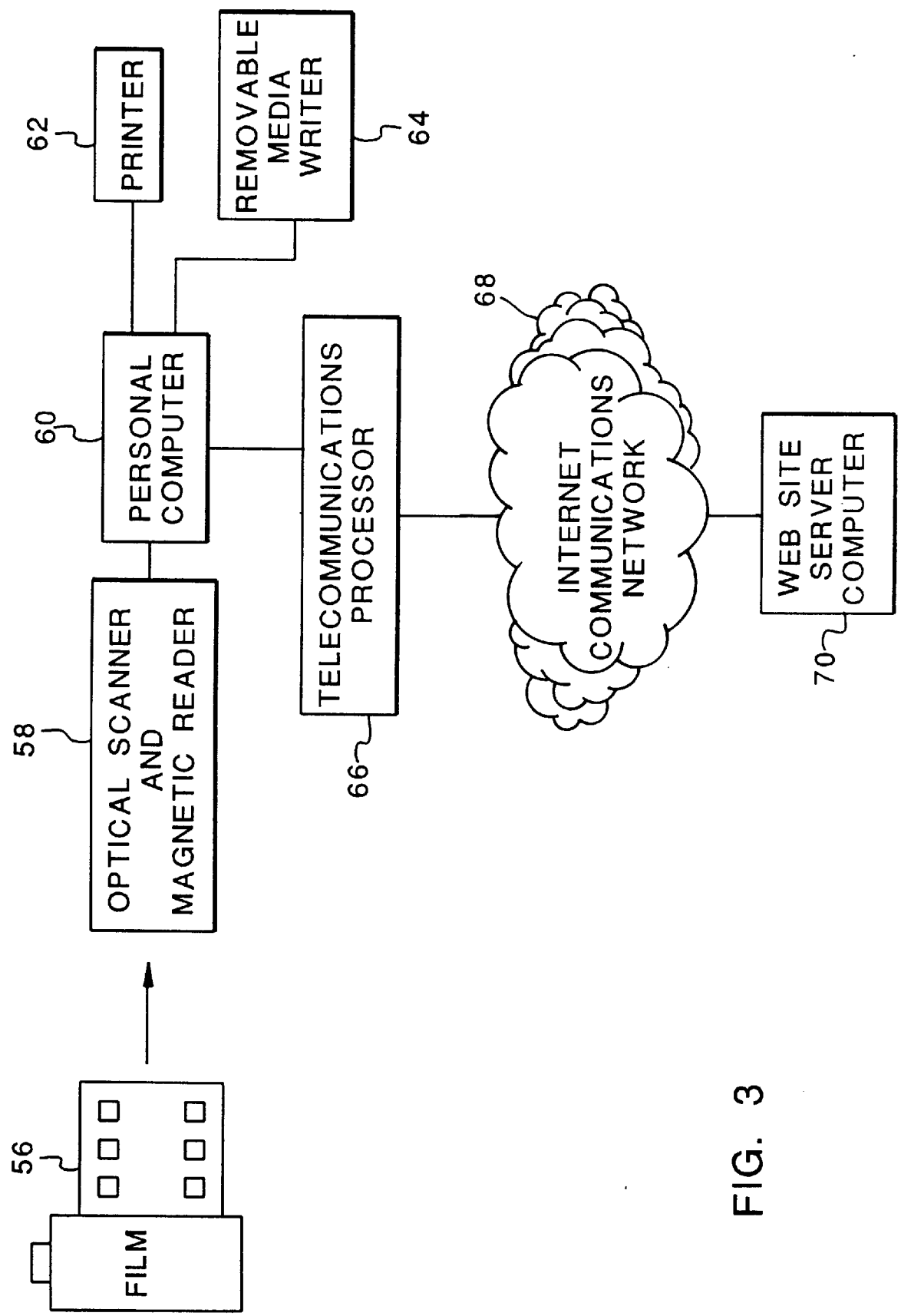
FIG. 3 is a schematic diagram illustrating a photographic processing system according to the present invention.
Figure 4:
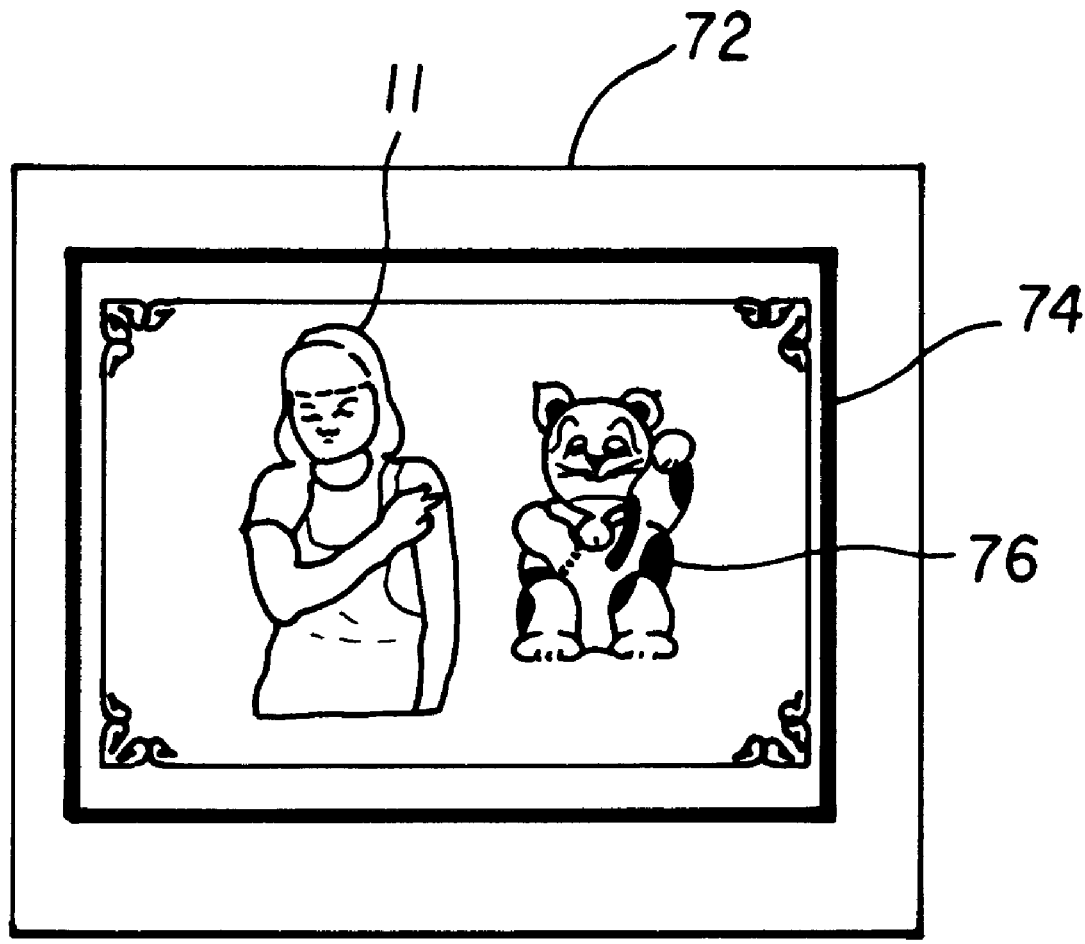
FIG. 4 is a diagram illustrating a digital image that has been processed to include a creative.

Referring to FIG. 3, after the developed and processed film 56 is scanned using an optical scanner with magnetic reading capability 58, the digitized images and the corresponding applet information are transferred to a personal computer 60. If the applet information is the actual executable code, the digitized images are processed by using the personal computer(PC) 60 and printed on printer 62 or written to removable media such as CD-R using a removable media writer 64. If the applet information is the address of an applet on a communications network such as the Internet 68, a communication link is established between PC 60 and the web server computer 70 by using the telecommunications processor 66. Consequently, the applets are downloaded to PC 60 and digitized images are processed using those applets. The processed images are then printed on the printer 62 or written to removable media such as CD-R using the removable media writer 64. FIG. 4 shows an example of a photograph 72 including an image of the subject 11 and a creative border 74 and a cartoon character 76.

Using the present invention, a photographer can capture an image at a special event and add digital image processing functions to the film. These functions, once executed will process the digital image to produce an enhanced image or add creatives such as borders or graphics to the image. The digital image processing functions can be stored as executable code in a memory in a camera or other recording device that is transferred to the film during photography. Alternatively, the digital image processing functions may be applied to the film as a location in a memory, or an address on a communication network pointing to the location of the executable code.

These and other aspects, objects, features and advantages of the present invention will be more clearly understood and appreciated from a review of the following detailed description of the preferred embodiments and appended claims, and by reference to the accompanying drawings.

The invention has been described with reference to a preferred embodiment. However, it will be appreciated that variations and modifications can be effected by a person of ordinary skill in the art without departing from the scope of the invention.

PARTS LIST 10 camera
11 subject
12 lens
14 beam splitter
15 shutter
16 photographic film
18 film advance mechanism
20 magnetic recording head
21 shutter release switch
22 micro processor
24 memory
26 applet selector switch
28 video driver
30 internal LCD
32 view finder
34 external/attached LCD
36 infrared transceiver
38 computer memory card socket
40 computer memory card
42 insert computer memory card step
44 activate camera step
46 select an applet step
48 frame the subject step
50 review the image step
52 activate shutter step
54 record applet information step
56 developed and processed film
58 optical scanner and magnetic reader
60 personal computer
62 printer
64 removable media writer
66 telecommunications processor
68 Internet communications network
70 web site server computer
72 photograph
74 creative border
76 cartoon character

We claim:

1. A photographic system for use with a photographic film having a magnetic recording medium, comprising:

a) a camera having a memory containing digital information, including information relating to a plurality of applets having executable code, for processing a digital image, means for selecting one or more of the applets to be applied to a digital image to be generated from a film image recorded by the camera, and magnetic recording means connected to the memory for recording the selected digital information on the magnetic recording medium on the film;

b) a scanner for scanning the photographic film to produce a digital image;

c) means for reading the digital information on the magnetic storage media, and d) a computer having a plurality of application programs for employing the applets for processing the digital images.

2. The photographic system claimed in claim 1, wherein the digital information relating to the applets is the actual executable code.

3. The photographic system claimed in claim 1, wherein the digital information is a pointer to one or more of the applets available to the computer on a communications network.

4. A photographic film having a magnetic recording medium on the film and digital information, including information relating to a plurality of applets having executable code, recorded on the magnetic recording medium for processing a plurality of digital images to be generated by scanning the film.

5. The photographic film claimed in claim 4, wherein the digital information relating to the applets is the actual executable code.

6. The photographic film claimed in claim 4, wherein the digital information is a pointer to one or more of the applets available to a computer on a communications network.

7. A photographic camera for use with photographic film of the type having a magnetic recording medium, comprising:

a) a memory containing digital information, including information relating to a plurality of applets having executable code, for processing a digital image;

b) means for selecting one or more of the applets to be applied to a digital image to be generated from a film image recorded by the camera; and c) magnetic recording means connected to the memory for recording the selected digital information on the magnetic recording medium.

8. The photographic camera claimed in claim 7, further comprising display means for displaying the image processing functions available in the memory.

9. The photographic camera claimed in claim 7, further comprising a transceiver for ordering and receiving the information relating to the digital image processing function.

\* \* \* \* \*